3,317,516
PROCESS FOR THE PRODUCTION OF
ε-CAPROLACTAM
Akira Mifune, Sachio Ishimoto, Osamu Ikeda, Michiyuki Tokashiki, Masaaki Sumi, and Hideo Matsui, Yamaguchi-ken, Japan, assignors to Teijin Limited, Osaka, Japan, a corporation of Japan
No Drawing. Filed Feb. 27, 1964, Ser. No. 347,687
Claims priority, application Japan, Mar. 7, 1963, 38/10,441; Mar. 22, 1963, 38/13,415; Apr. 20, 1963, 38/20,059; June 24, 1963, 38/32,697; Jan. 13, 1964, 39/1,250
14 Claims. (Cl. 260—239.3)

This invention relates to a novel process for the production of ε-caprolactam from ε-caprolactone, ε-hydroxycaproamide or amide-forming derivatives of ε-hydroxycaproic acid.

Heretofore as the processes for the production of ε-caprolactam, that by Beckmann's rearrangement of cyclohexanone oxime and that of acting on a cyclohexyl compound such as cyclohexane carboxylic acid, with a nitrosation agent and oleum are known. However in these processes always large amounts of ammonium sulfate is by-produced, and the disposal thereof presents an industrial drawback.

As a method to overcome this problem, there is proposed a process wherein ε-caprolactone is heated at high temperatures and superatmospheric pressures in the presence of aqueous ammonia to yield ε-caprolactam (hereinafter shall be referred to simply as lactam).

For example, according to the process in U.S. Patent No. 3,000,880, ε-caprolactone and aqueous ammonia are reacted to obtain lactam at one pass yield of about 50%. In that process, however, the reaction temperatures employed are very high, such as from the critical temperature of water to plus 100° C. thereto, and therefore the reaction pressure produced is as high as above 220 kg./cm.$^2$.

Again U.S. Patent No. 3,000,879 discloses a process in which a 25% aqueous solution of ε-hydroxycaproamide is heated to 350° C. in a closed vessel to form lactam at one pass yield of about 30%. At that time the reaction temperatures employed also range very high, as 300–475° C., preferably 350–425° C. and therefore the reaction pressure produced rises above 150 kg./cm.$^2$.

It is obvious that the practice of these known processes using high temperatures and pressures on an industrial scale will encounter many difficulties in respect of the equipments, and also suffer operational disadvantages. Furthermore, because the reaction is performed at such high temperatures, objectionable side-reactions such as polymerization and/or thermal decomposition of the starting material, intermediates therefrom and the product lactam take place, and the obtained lactam shows remarkable coloration.

We carried out extensive researches to eliminate the above-described deficiencies and reached the subject invention.

In accordance with this invention, it is found that by heating ε-caprolactone or ε-hydroxycaproamide or amide-forming derivatives of ε-hydroxycaproic acid together with aqueous ammonia to 200–400° C. in the presence of at least one catalyst selected from the group consisting of noble metal-containing hydrogenation catalysts, nickel-containing hydrogenation catalysts, and cobalt-containing hydrogenation catalysts, lactam of little coloration can be readily produced.

The characteristics of this invention resides in that particularly within the aforesaid temperature range, at such relatively low temperatures as 200–330° C., inter alia, 250–330° C. which could not be used in the prior methods, lactam can be produced at the same or greater reaction rate than that of the prior methods. Furthermore in accordance with this invention, the above reaction can be carried out in hydrogen-containing gaseous atmosphere to produce excellent lactam of even less coloration.

This invention will now be explained in detail hereinbelow.

In this invention, as the starting material amide-forming derivatives of ε-hydroxycaproic acid may also be used as well as ε-caprolactone and ε-hydroxycaproamide. The said amide-forming derivatives include, for example:

(a) lower alkyl esters of ε-hydroxycaproic acid, such as methyl-, ethyl-, propyl-esters thereof, (b) cycloalkyl esters of ε-hydroxycaproic acid, such as cyclohexyl ester thereof, (c) aralkyl esters of ε-hydroxycaproic acid, such as benzyl ester thereof, (d) aryl esters of ε-hydroxycaproic acid, such as phenyl ester thereof, and (e) ammonium salt of ε-hydroxycaproic acid and alkali metal salts of the acid such as sodium and potassium salts thereof.

These amide-forming derivatives are readily converted to ε-hydroxycaproamide, reacting with ammonia or aqueous ammonia. Therefore, all of these compounds can be used as the starting material of this invention as well as ε-caprolactone and ε-hydroxycarproamide.

In this invention the starting material is heated in aqueous ammonia, the characteristic feature being that at that time any one or combination of noble metal-containing hydrogenation catalysts, nickel-containing hydrogenation catalysts and cobalt-containing hydrogenation catalysts are used. Generally speaking, usual catalysts for hydrogenation in the chemical industry are all useful for this invention, but they must be, as their common property, hard-soluble in aqueous ammonia used during the reaction of this invention.

Such noble metal-containing hydrogenation catalysts may be used are: noble metals such as palladium, platinum, rhodium, ruthenium, osmium and iridium; mixtures of these metals, oxides of these metals, and these metals and oxides supported on carriers.

The nickel-containing hydrogenation catalysts are: metallic nickel, nickel supported on carriers and various nickel compounds including stabilized nickel catalysts such as nickel-formate, reduced nickel such as nickel on alumina and nickel on kieselguhr, and Raney nickel and Urushibara-nickel. Particularly Raney nickel is useful.

As the cobalt-containing hydrogenation catalyst, metallic cobalt and that supported on carriers are preferred. For example, they are non-supported reduced cobalt, reduced cobalt supported on alumina, on kieselguhr, on active carbon, etc., and Raney-cobalt. Particularly Raney-cobalt is suited. Again, cobalt-containing hydrogenation catalysts are likewise useful as multi-elementary catalyst such as cobalt-nickel, or cobalt-nickel-iron.

These noble metals, their oxides, nickel, nickel compounds and cobalt may be used singly or as mixtures, with or without suitable carriers. As the carriers, those normally used as carriers of hydrogenation catalysts, such as carbon, alumina, silica, alumina-silica and kieselguhr can be used.

These catalysts may be used within the amount of 0.01–50, preferably from 0.05–50, percent by weight to the starting material. Particularly preferred amount for noble metal-containing hydrogenation catalysts is, as the metal, not less than 0.01% by weight to the starting material, and that for nickel-containing or cobalt-containing catalysts is 0.5–30% by weight.

Generally, use of larger amounts of these catalysts in this invention is not appreciably deleterious, but neither is particularly advantageous. Therefore the catalysts of this invention may be used in an amount not less than 0.01, more preferably 0.5% by weight based on the starting material, the upper limit being determined by economic consideration.

These catalysts may be in the form of powder, granules or pellets. The reaction may be performed in any type such as suspension, fixed bed, moving bed or fluidized bed. Again the reaction can be performed batchwise or in continuous system, and a part or whole of the reactants and/or catalyst may be recycled during the operation.

More concretely, in accordance with the process of this invention the aforesaid starting material and aqueous ammonia are charged in a presure vessel, and added with the said hydrogenation catalyst at the specified ratio. Then the air inside the vessel is either evacuated or substituted by an inert gas such as nitrogen or by ammonia, hydrogen or hydrogen-containing inert gas to atmospheric or superatmospheric pressure. Thereafter the reaction is carried out at 200–400° C., particularly 250–330° C. and autogenous pressure of the reaction mixture.

In this invention, the preferred mol ratio between the starting material and the aqueous ammonia in terms of pure ammonia to be fed into the reaction system is 1–25 of the latter, preferably 2–15, to 1 of the latter. Again generally the concentration of the aqueous ammonia employed is 0.1–35% by weight, preferably 8–28% by weight, the concentration however not being necessarily critical to this invention.

The reaction time varies depending on the reaction conditions. However, since if the reaction is continued too long the yield tends to be lowered because of the side reactions such as decomposition, generally it is desirable to select suitable reaction time within the range of 15 minutes to 15 hours.

Thus, an aqueous ammonia solution of crude lactam is obtained. For separation and recovery of lactam therefrom, optionally such means as solvent-extraction and vacuum distillation may be employed. However, since the reaction liquid still contains a large amount of water soluble intermediates convertible to lactam, it is preferred to recover lactam therefrom by solvent-extraction followed by distillation. As the solvent, any of conventional lactam-extracting solvents such as hydrocarbons including, for example, benzene, toluene and cyclohexane; and halogenated hydrocarbons such as chloroform and carbon tetrachloride may be used. By such means it is made possible to recycle the solution remaining after the extraction to the reaction of this invention. The catalyst used in the reaction may be separated at any stage before or after the solvent-extraction. Thus separated catalyst can be used again as it is, or after subjection to regenerating treatment such as steam bubbling.

The effectiveness of the catalyst of this invention is particularly conspicuous when the atmosphere in the reaction vessel is substituted by hydrogen compared with the cases wherein other inert gases are used. That is, in the former case the catalyst exhibits still better selectivity and promotes the main lactam-forming reaction dominantly.

Generally in the production of lactam from the aforesaid starting materials, at temperatures below 300° C. the maximum one pass yield is about 6–12% when no catalyst is used. In contrast thereto, according to this invention it is made possible to obtain lactam with the one pass yield of at least 15%, normally at such a high yield as more than 30%.

Furthermore in spite of the low temperature the reaction rate is great and therefore, the reaction time is shortened.

Thus in accordance with this invention the reaction can be very advantageously carried out at such low temperatures as 330° C. or below, and consequently it is made possible to perform the reaction at low pressures. This is very advantageous from the standpoint of equipment facilities and ease of operations.

Still in addition, because the reaction is performed at low temperatures the side reaction is reduced and the resultant crude lactam is substantially free of colors, and has high purity. Therefore the subsequent refining operation of the same is easy.

Again if the process of this invention is performed at high temperatures as employed in the prior methods (for example, 350° C. or higher, or above the critical temperature of water), the reaction rate is greater than those of the known methods, and therefore less-colored lactam is obtain within the shortened reaction time at the same or higher yield than in the known methods. This renders the process of this invention particularly advantageous from the industrial viewpoint, when it is performed in the manner of continuous flow operation.

Hereinafter the invention will be explained with reference to working examples, it being understood that this invention is in no sense limited thereby.

EXAMPLE 1.—CONTROL TESTS—NO HYDROGEN ATMOSPHERE

A SUS–32 stainless steel autoclave (300 cc.) fitted with magnetic stirrer was charged with 11.4 g. of $\epsilon$-caprolactone, 122 g. of 14% aqueous ammonia (mol ratio between lactone and ammonia=1:10) and 1.82 g. of Pd on C catalyst (metal content, 5% by weight; amount of the metal based on the lactone, 0.8% by weight). Upon substituting the atmosphere with nitrogen, the content was heated under stirring. After 5 hours of reaction at 290° C., the heating and stirring were stopped, and the autoclave was left to cool off. When cooled, the reaction liquid was taken out, removed of the catalyst and was extracted with chloroform.

Upon distillation of the chloroform solution to distill off the chloroform, 4.7 g. of crude lactam was obtained at a one pass yield of 41.6%. Thus obtained lactam was only very slightly colored.

EXAMPLE 2

A similar autoclave as used in Example 1 was charged with 11.4 g. of $\epsilon$-caprolactone, 122 g. of 14% aqueous ammonia (mol ratio between lactone and ammonia =1:10) and 1.82 g. of Pd on C catalyst (metal content, 5% by weight; amount of the metal based on the lactone, 0.8% by weight). The atmosphere inside the autoclave was substituted by hydrogen, to the hydrogen pressure of 20 kg./cm.$^2$, and the content was heated under stirring. After 5 hours of the reaction at 290° C., 5.1 g. of crude lactum was obtained from the reaction liquid by the separation steps as in Example 1. This corresponds to a one pass yield of 45.1%. Thus obtained $\epsilon$-caprolactam was substantially free from colors.

EXAMPLE 3

A similar autoclave as used in Example 1 was charged with 22.8 g. of $\epsilon$-caprolactone, 170 g. of 10% aqueous ammonia (mol ratio between lactone and ammonia =1:5) and 0.228 g. of Pd on kieselguhr, catalyst (metal content, 5% by weight; amount of the metal based on the lactone, 0.05% by weight). Upon substitution of the atmosphere with hydrogen, the content was heated under stirring.

After 3 hours of the reaction at 340° C., 9.6 g. of crude lactam was obtained from the reaction liquid in an analogous manner as Example 1, which corresponds to a one pass yield of 42.5%.

EXAMPLE 4

A similar autoclave as used in Example 1 was charged with 13.1 g. of $\epsilon$-hydroxycaproamide, 170 g. of 10% aqueous ammonia (mol ratio between $\epsilon$-hydroxycaproamide and ammonia=1:10) and 2.6 g. of Pd on C catalyst (metal content, 5% by weight; amount of the metal based on the $\epsilon$-hydroxycaproamide, 1.0% by weight). Upon substitution of the atmosphere with hydrogen until the hydrogen pressure reached 10 kg./cm.$^2$, the content was heated under stirring. After 3 hours of the reaction at 290° C. followed by the separation steps as employed in Example 1, 3.5 g. of crude lactam was obtained, which corresponds to a one pass yield of 31.0%.

Thus obtained lactam was substantially free from colors.

EXAMPLE 5

A similar autoclave as used in Example 1 was charged with 22.8 g. of ε-caprolactone, 122 g. of 14% aqueous ammonia (mol ratio between lactone and ammonia =1:5) and 0.684 g. of Pt on C catalyst (metal content, 5% by weight; amount of the metal based on the lactone, 0.15% by weight). Upon substitution of the atmosphere with hydrogen until the hydrogen pressure reached 10 kg./cm.$^2$, the content was heated under stirring.

After 5 hours of the reaction at 275° C. followed by the analogous separation procedures as in Example 1, 10.1 g. of crude lactam was obtained, which corresponds to a one pass yield of 44.7%. The resultant lactam was substantially free from colors.

EXAMPLE 6

A similar autoclave as used in Example 1 was charged with 11.4 g. of ε-caprolactone, 61 g. of 28% aqueous ammonia (mol ratio between the lactone and ammonia =1:10) and 0.057 g. of Adams type platinum-rhodium catalyst (platinum:rhodium by weight=1:3; amount of the catalyst based on the lactone, 0.5% by weight). Upon substitution of the atmosphere with hydrogen until the hydrogen pressure reached 10 kg./cm.$^2$, the content was heated under stirring. After 7 hours of the reaction at 250° C. followed by analogous separation procedures as in Example 1, 4.2 g. of crude lactam was obtained.

This corresponds to a one pass yield of 37.2%.

The resultant lactam was substantially free from colors.

EXAMPLE 7.—CONTROL TEST—NO HYDROGEN ATMOSPHERE

A similar autoclave as used in Example 1 was charged with 22.8 g. of ε-caprolactone, 122 g. of 14% aqueous ammonia (mol ratio between the lactone and ammonia =1:5) and 1.0 g. (4.4% by weight based on the lactone) of Raney nickel prepared in accordance with W-5 method, and its inside atmosphere was substituted by nitrogen, followed by heating under stirring of the content.

After 5 hours of the reaction at 290° C., the heating and stirring were stopped and the autoclave was left to cool off. When cooled, the reaction liquid was taken out, removed of the catalyst, and extracted with chloroform. Upon distillation of the chloroform solution to distil off the chloroform, 10.2 g. of crude lactam was obtained. This corresponds to a one pass yield of 45.2%. Thus obtained lactam was substantially free from colors.

*Control 1*

A similar autoclave as used in Example 1 was charged with 22.8 g. of ε-caprolactone, 122 g. of 14% aqueous ammonia (mol ratio between the lactone and ammonia =1:5), replaced of its atmosphere with nitrogen, and its content was heated under stirring.

After 5 hous of the reaction at 275° C. followed by analogous separation procedures as in Example 1, 3.0 g. of crude lactam was obtained. This corresponds to a one pass yield of only 13.3%.

Thus obtained lactam was colored deep brown and inferior in quality.

As is apparent from this control, according to the invention qualitatively excellent lactam can be obtained at remarkably improved yields, compared with the prior known methods wherein no catalyst is used.

EXAMPLE 8

A similar autoclave as used in Example 1 was charged with 22.8 g. of ε-caprolactone, 122 g. of 14% aqueous ammonia (mol ratio between lactone and ammonia =1:5) and 1.0 g. (4.4% by weight based on the lactone) of Raney nickel prepared in accordance with W-5 method, and its inside atmosphere was replaced with hydrogen, until the hydrogen pressure reached 20 kg./cm.$^2$. The content was then heated under stirring. After 5 hours of the reaction at 275° C. followed by analogous separation procedures as in Example 1, 11.5 g. of crude lactam was obtained. This corresponds to a one pass yield of 50.9%.

Thus obtained lactam was substantially free from colors.

EXAMPLE 9

A similar autoclave as used in Example 1 was charged with 11.4 g. of ε-caprolactone, 61 g. of 28% aqueous ammonia (mol ratio between lactone and ammonia =1:10) and 1.0 g. of reduced nickel (supported on kieselguhr, nickel content 45% by weight; 8.8% by weight based on the lactone), and its inside atmosphere was substituted with hydrogen, until the hydrogen pressure reached 10 kg./cm.$^2$. The content was then heated under stirring.

After 3 hours of the reaction at 340° C. followed by analogous separation procedures as in Example 1, 4.6 g. of crude lactam was obtained.

This corresponds to a one pass yield of 40.7%.

EXAMPLE 10.—CONTROL TEST—NO HYDROGEN ATMOSPHERE

A similar autoclave as used in Example 1 was charged with 13.1 g. of ε-hydroxycaproamide, 122 g. of 14% aqueous ammonia (mol ratio between ε-hydroxycaproamide and ammonia=1:10) and 2.6 g. (20% by weight based on the ε-hydroxycaproamide) of Raney nickel prepared in accordance with W-5 method.

After substitution of the atmosphere with nitrogen, the content was heated under stirring. The reaction was continued for 3 hours at 300° C. and from the resultant reaction liquid 2.1 g. of crude lactam was recovered by the separation procedures analogous to those of Example 1.

This corresponds to a one pass yield of 18.6%.

*Control 2 (to be compared with Example 10)*

A similar autoclave as used in Example 1 was charged with the ε-hydroxycaproamide and aqueous ammonia at the same conditions as in Example 10, and after substitution of the atmosphere with nitrogen, the content was heated under stirring.

The reaction was continued for 5 hours at 275° C., and from the resultant reaction liquid 0.7 g. of crude lactam was obtained by the separation procedures analogous to those in Example 1. This corresponds to a one pass yield of 6.2%. The product lactam was colored deep brown, and inferior in quality.

EXAMPLE 11

The same autoclave as used in Example 1 was charged with 13.1 g. of ε-hydroxycaproamide, 122 g. of 14% aqueous ammonia (mol ratio between ε-hydroxycaproamide and ammonia=1:10) and 3.9 g. (29.8% by weight based on the ε-hydroxycaproamide) of Raney nickel prepared in accordance with W-5 method, and its inside atmosphere was substituted by hydrogen until the hydrogen pressure reached 20 kg./cm.$^2$. The content was then heated under stirring.

The reaction pressure reached 95 kg./cm.$^2$. After 5 hours of the reaction at 275° C., the heating and stirring were stopped, and the autoclave was left to cool off. When it was cooled, the reaction liquid was taken out, removed of the catalyst and extracted with chloroform. Upon distillation of the chloroform solution to distil off the chloroform, 4.3 g. of crude lactam was obtained. This corresponds to one pass yield of 38.1%. Thus obtained lactam was substantially free from colors.

*Control 3 (to be compared with Example 11)*

A similar autoclave as used in Example 1 was charged with 13.1 g. of ε-hydroxycaproamide and 122 g. of 14% aqueous ammonia (mol ratio between ε-hydroxycaproamide and ammonia=1:10), and after substitution of the atmosphere with hydrogen, the content was heated under stirring.

The reaction was continued for 5 hours at 275° C., and from the resultant reaction liquid 1.6 g. of crude lactam was obtained by the analogous separation procedures as in Example 1. This corresponds to a one pass yield of only 12.2%.

EXAMPLE 12

A similar autoclave as used in Example 1 was charged with 13.1 g. of ε-hydroxycaproamide, 122 g. of 14% aqueous ammonia (mol ratio between ε-hydroxycaproamide and ammonia=1:10) and 0.5 g. (3.8% by weight based on the ε-hydroxycaproamide) of Raney nickel prepared in accordance with W-5 method, and its inside atmosphere was substituted by hydrogen. Thereafter hydrogen was further supplied until the inside pressure reached 10 kg./cm.², and the content was heated under stirring. The reaction was continued for 5 hours at 275° C., and from the resultant reaction liquid 2.9 g. of crude lactam was obtained by the separation procedures analogous to those of Example 1. This corresponds to a one pass yield of 25.7%.

Thus obtained lactam was substantially free from colors.

EXAMPLE 13

A similar autoclave as used in Example 1 was charged with 11.4 g. of ε-caprolactone, 60.7 g. of 14% aqueous ammonia, 1.8 g. of pure water (mol ratio of lactone:ammonia:water=1:5:30) and 1.1 g. (about 10% by weight based on the lactone) of developed Raney cobalt, and after substitution of the inside atmosphere with nitrogen, hydrogen was introduced thereinto until 5 kg./cm.² gauge pressure. Then the content was heated under stirring.

After 3 hours of the reaction at 275° C., the reaction liquid was taken out, removed of the catalyst and extracted with chloroform. Distilling off the chloroform from the extraction liquid, the remaining liquid was distilled under a reduced pressure to yield 4.1 g. of lactam. This corresponds to a one pass yield of 40.6%.

EXAMPLE 14

The same autoclave as used in Example 1 was charged with 11.4 g. of ε-caprolactone, 60.7 g. of 28% aqueous ammonia, 46.3 g. of pure water (mol ratio of lactone:ammonia:water=1:10:50) and 2.2 g. (about 20% by weight based on the lactone) of developed Raney-cobalt, and after substitution of the atmosphere with nitrogen, hydrogen was introduced thereinto until a gauge pressure of 10 kg./cm.² was attained. Then the content was heated under stirring. After 5 hours of the reaction at 280° C., the heating and stirring were stopped, and the autoclave was left to cool off. By the following separation procedures analogous to those of Example 13, 4.5 g. of lactam was obtained.

This corresponds to a one pass yield of 44.6%.

EXAMPLES 15-18

Epsilon-caprolactone or ε-hydroxycaproamide and aqueous ammonia were subjected to the similar treatment as in Example 1 under varied conditions. The conditions and the corresponding results were as shown in the tables below.

| Example No. | Starting material | | Aqueous ammonia | | Water (g.) | Mol ratio starting material NH₃:H₂O | Catalyst | | |
|---|---|---|---|---|---|---|---|---|---|
| | Type | Amount (g.) | Concentration (percent) | Amount (g.) | | | Type | Amount (g.) | Catalyst (g.)/ starting material (g.) (percent) |
| 15 | ε-Caprolactone | 11.4 | 27.8 | 61 | 136 | 1:10:100 | Rh on C | 2.3 | 1.0 |
| 16 | do | 13.0 | 27.8 | 70 | 52 | 1:10:58 | RuO₂ | 1.59 | 7.5 |
| 17 | do | 11.4 | 24.4 | 70 | 52 | 1:10:58.4 | Ni-formate | 3.0 | 26.4 |
| 18 | ε-Hydroxy caproamide | 13.1 | 14.0 | 122 | 0 | 1:10:58 | Raney-Co | 2.6 | 20 |

| Ex. No. | Atmosphere | | Reaction conditions | | ε-Caprolactam | | |
|---|---|---|---|---|---|---|---|
| | Type | Pressure (kg./cm.²) | Temp. (° C.) | Time (hr.) | Amount produced (g.) | One pass yield (percent) | Color |
| 15 | H₂ | 10 | 380 | 0.5 | 5.7 | 50.5 | Substantially no coloration. |
| 16 | H₂ | 10 | 275 | 1 | 2.8 | 21.7 | Do. |
| 17 | H₂ | 20 | 300 | 2 | 5.1 | 45.1 | Do. |
| 18 | H₂ | 10 | 300 | 3 | 2.7 | 23.9 | Do. |

EXAMPLE 19

A similar autoclave as used in Example 1 was charged with 8.8 g. of methyl ε-hydroxycaproate, 38.0 g. of 25.9% aqueous ammonia (mol ratio between methyl ε-hydroxycaproate and ammonia=1:9.6) and 26.0 g. of pure water. To the same, 1.1 g. (12.5% by weight based on the methyl ε-hydroxycaproate) of Raney-nickel prepared in accordance with W-5 method was further added, and the inside atmosphere was substituted by hydrogen, until the hydrogen pressure reached 10 kg./cm.². The content was then heated under stirring. After 2 hours of the reaction at 275° C., 3.2 g. of crude lactam was obtained from the reaction liquid by the analogous separation procedures as in Example 1. This corresponds to a one pass yield of 47.2%. The resultant lactam was substantially free from colors.

EXAMPLE 20

A similar autoclave as used in Example 1 was charged with 21.4 g. of cyclohexyl ε-hydroxycaproate, 60.7 g. of 28% aqueous ammonia (mol ratio between cyclohexyl ε-hydroxycaproate and ammonia=1:10), 46.3 g. of pure water and 3.0 g. of developed Raney-nickel (the amount of metal based on the cyclohexyl ε-hydroxycaproate, 14%). After substituting the atmosphere with hydrogen, it was further supplied until the pressure reached 10 kg./cm.², and the content was heated under stirring.

The reaction was continued for 3 hours at 280° C. and from the reaction liquid 4.8 g. of crude lactam was recovered in the similar manner as in Example 1. This corresponds to a one pass yield of 42.5%. The resultant lactam was substantially free from colors.

EXAMPLE 21.—CONTROL TEST—NO HYDROGEN ATMOSPHERE

A similar autoclave as used in Example 1 was charged with 9.0 g. of ammonium ε-hydroxycaproate, 20.0 g. of 25.9% aqueous ammonia (mol ratio between ammonium ε-hydroxycaproate and ammonia=1:5) and 39.2 g. of pure water, to which 0.52 g. (4.97% by weight based on the ammonium ε-hydroxycaproate) of Adams type platinum oxide catalyst being added. After substituting the atmosphere with nitrogen, the content was heated under stirring. The reaction was continued for 1 hour at 275° C. followed by the separation procedures analogous to those in Example 1, yielding 2.9 g. of crude lactam. This corresponds to a one pass yield of 44.3%.

EXAMPLE 22

A similar autoclave as used in Example 1 was charged with 15.4 g. of sodium ε-hydroxycaproate, 60.7 g. of 28% aqueous ammonia (mol ratio between sodium ε-hydroxycaproate and ammonia=1:10), 46.3 g. of pure water and 2.0 g. of 4% Pt-1% Pd on C catalyst (the amount of metal based on the sodium ε-hydroxycaproate, 0.65%). After substituting the atmosphere with a gaseous mixture of 1:1 hydrogen-nitrogen, the same gas was further supplied until the inside pressure reached 10 kg./cm.$^2$, and the content was heated under stirring.

The reaction was continued for 3 hours at 300° C., and from the reaction liquid 3.5 g. of crude lactam was recovered in an analogous manner as in Example 1. This corresponds to a one pass yield of 31.5%. Thus obtained caprolactam was substantially free from colors.

EXAMPLE 23

A similar autoclave as used in Example 1 was charged with 11.4 g. of ε-caprolactone, 60.7 g. of 28% aqueous ammonia (mol ratio between ε-caprolactone and ammonia=1:10), 46.3 g. of pure water and 1.82 g. of 2.5% Pt-2.5% Pd on C catalyst (the amount of metal based on the ε-caprolactone, 0.8%). After substitution of the atmosphere with nitrogen, the content was heated under stirring.

The reaction was continued for 5 hours at 220° C., and from the resultant reaction liquid 1.5 g. of crude lactam was obtained in the similar manner as in Example 1. This corresponds to a one pass yield of 13.3%. Thus produced lactam was colored light yellow.

EXAMPLE 24

A similar autoclave as used in Example 1 was charged with 11.4 g. of ε-caprolactone, 61 g. of 28% aqueous ammonia (mol ratio between ε-caprolactone and ammonia= 1:10), 61 g. of pure water and 1.0 g. (8.8% by weight based on the ε-caprolactone) of Raney nickel prepared in accordance with a W-5 method. After substitution of the atmosphere with hydrogen until the hydrogen pressure reached 20 kg./cm.$^2$, the content was heated with stirring. The reaction was continued for 3 hours at 275° C., and thereafter the autoclave was left to cool off. Upon cooling, the reaction liquid was taken out, removed of the catalyst, and extracted with chloroform. Treating the chloroform layer in the similar manner as in Example 1, 4.3 g. of crude lactam was obtained. This corresponds to a one pass yield of 38.0%.

Then to the aqueous layer remaining after the extraction, ε-caprolactone in an amount corresponding to the lactam extracted with chloroform and aqueous ammonia corresponding to the amount lost during the reaction and post-treatments were added to form a liquid of the same composition before the reaction. As the catalyst, 1.0 g. of Raney nickel prepared similarly in accordance with W-5 method was added thereto, and the liquid was reacted and treated in the manner as above-described. After six times of the repetitive operations, the following results were obtained.

| Run No. | Lactone added (g.) | 28% Aqueous ammonia added (g.) | Crude lactam (g.) | One pass yield (percent) | Remarks |
|---|---|---|---|---|---|
| 1 | 11.4 | 61.0 | 4.3 | 38.0 | New reaction liquid. |
| 2 | 4.4 | 57.2 | 4.3 | 38.0 | Recycled reaction liquid (1). |
| 3 | 4.4 | 57.2 | 3.7 | 32.7 | Recycled reaction liquid (2). |
| 4 | 3.7 | 56.9 | 4.3 | 38.0 | Recycled reaction liquid (3). |
| 5 | 4.4 | 57.2 | 5.0 | 44.2 | Recycled reaction liquid (4). |
| 6 | 5.0 | 57.6 | 4.3 | 38.0 | Recycled reaction liquid (5). |

The total amount of the crude lactam obtained from the six runs was 25.9 g., corresponding to the total yield of 78.6%. Thus obtained lactam was substantially free from colors.

EXAMPLE 25

A 1000 cc. stainless steel autoclave fitted with magnetic vertical stirrer was charged with 45.6 g. of ε-caprolactone, 428 g. of 15.9% aqueous ammonia (mol ratio between ε-caprolactone and ammonia=1:10), and 6.84 g. of Pt-Pd on C catalyst (Pt:Pd=1:1; the metal content, 5% by weight: and the amount of the metal based on the ε-caprolactone, 0.75% by weight). After substitution of the atmosphere with hydrogen until the pressure reached 10 kg./cm.$^2$, the content was treated under stirring. The reaction was continued for an hour at 275° C., and thereafter the autoclave was left to cool off. Upon cooling, the reaction liquid was treated in the similar manner as in Example 1, and 19.9 g. of crude lactam was obtained. This corresponds to a one pass yield of 44.1%.

Then the catalyst separated by filtration was treated for 2 hours in boiling water, dried and added to newly prepared mixture of ε-caprolactone and aqueous ammonia at the same ratio as in the above. Thus the reaction was repeated under the same conditions. After 5 times repetitive use of the catalyst, the following results were obtained.

| Run No. | Cat. wt. (g.) | Reaction pressure (kg./cm.$^2$) | Crude lactam (g.) | One pass yield (percent) |
|---|---|---|---|---|
| 1 | 6.84 | 107-115 | 19.9 | 44.1 |
| 2 | 6.7 | 102-115 | 19.8 | 43.9 |
| 3 | 6.7 | 102-115 | 20.3 | 45.0 |
| 4 | 6.7 | 103-113 | 17.7 | 39.2 |
| 5 | 6.6 | 100-108 | 20.2 | 44.7 |

We claim:
1. A process for the production of epsilon-caprolactam which comprises heating at least one compound selected from the group consisting of epsilon-caprolactone, epsilon-hydroxycaproamide and amide-forming derivatives of epsilon-hydroxycaproic acid, together with aqueous ammonia whose ammonia concentration is from 5 to 35% by weight, to the temperatures ranging from 200° to 400° C. in the presence of at least one member of the group consisting of noble metal-containing hydrogenation catalysts, nickel-containing hydrogenation catalysts and cobalt-containing hydrogenation catalysts and in an atmosphere of hydrogen or hydrogen-containing inert gas.

2. The process for the production of epsilon-caprolactam in accordance with claim 1, in which the noble metal-containing hydrogenation catalyst is selected from the group consisting of palladium (Pd), platinum (Pt), rhodium (Rh), ruthenium (Ru), osmium (Os) and iridium (Ir), oxides of these metals and these metals and oxides thereof supported on carriers.

3. The process for the production of epsilon-caprolactam in accordance with claim 1, in which the noble metal-containing hydrogenation catalyst is selected from the group consisting of palladium (Pd), platinum (Pt), rhodium (Rh), ruthenium (Ru), osmium (Os) and iridium (Ir), oxides of these metals and these metals and oxides thereof supported on carriers.

4. The process for the production of epsilon-caprolactam in accordance with claim 1 in which the nickel-containing hydrogenation catalyst is selected from the group consisting of metallic nickel, nickel supported on carriers and nickel compounds.

5. The process for the production of epsilon-caprolactam in accordance with claim 1, in which the nickel-containing hydrogenation catalyst is selected from the group consisting of metallic nickel, nickel supported on carriers and nickel compounds.

6. The process for the production of epsilon-caprolactam in accordance with claim 1 in which the cobalt-containing hydrogenation catalyst is selected from the group consisting of metallic cobalt and cobalt supported on carriers.

7. The process for the production of epsilon-caprolactam in accordance with claim 1 in which the cobalt-containing hydrogenation catalyst is selected from the group consisting of metallic cobalt and cobalt supported on carriers.

8. The process according to claim 1, in which the carrier is selected from the group consisting of carbon, alumina, silica, alumina-silica and kieselguhr.

9. The process of claim 1 in which the catalyst or catalysts are used in an amount not less than 0.01%, preferably not less than 0.05%, by weight based on the epsilon-caprolactone, epsilon-hydroxycaproamide or amide-forming derivatives of epsilon-hydroxycaproic acid.

10. The process of claim 1 in which the heating is performed in a pressure vessel at autogenous pressure of the reaction mixture in batch system or continuous system.

11. The process of claim 1 in which the heating is performed in a pressure vessel at autogenous pressure of the reaction mixture in batch system or continuous system.

12. The process of claim 1 in which the aqueous ammonia has a concentration ranging from 5 to 35% by weight, and used in such an amount that the mol ratio of the ammonia component to the epsilon-caprolactone or epsilon-hydroxycaproamide or amide-forming derivatives of epsilon-hydroxycaproic acid becomes 1:1 to 25:1.

13. The process of claim 1 in which the amide-forming derivative of epsilon-hydroxycaproic acid is selected from the group consisting of alkyl-, cycloalkyl-, aralkyl-, and aryl-esters of epsilon-hydroxycaproic acid and ammonium salt and alkali metal salts of the same acid.

14. The process of claim 1 in which the amide-forming derivative of epsilon-hydroxycaproic acid is selected from the group consisting of alkyl-, cycloalkyl-, aralkyl-, and aryl-esters of epsilon-hydroxycaproic acid and ammonium salt and alkali metal salts of the same acid.

References Cited by the Examiner

UNITED STATES PATENTS

| | | | |
|---|---|---|---|
| 2,817,646 | 12/1957 | Payne | 260—239.3 |
| 2,840,553 | 6/1958 | Pieper | 260—239.3 |
| 2,840,554 | 6/1958 | Pieper | 260—239.3 |
| 3,000,877 | 9/1961 | Phillips et al. | 260—239.3 |
| 3,000,878 | 9/1961 | Phillips et al. | 260—239.3 |
| 3,000,879 | 9/1961 | Phillips et al. | 260—239.3 |
| 3,000,880 | 9/1961 | Phillips et al. | 260—239.3 |

WALTER A. MODANCE, *Primary Examiner.*

JOHN D. RANDOLPH, *Examiner.*

ROBERT T. BOND, *Assistant Examiner.*